United States Patent
Backe et al.

(10) Patent No.: US 9,893,506 B2
(45) Date of Patent: Feb. 13, 2018

(54) DAMPING ARRANGEMENT FOR AN OSCILLATABLY MOUNTED ELECTRICAL ENERGY TRANSMISSION DEVICE

(71) Applicant: SIEMENS AKTIENGESELLSCHAFT, Munich (DE)

(72) Inventors: Frank Backe, Zossen (DE); Michael Bartz, Berlin (DE); Ulf Heinrich, Potsdam (DE); Helmut Holler, Berlin (DE); Gunther Krausse, Hof (DE); Claude Proste, Sartrouville (FR); Beat Schmied, Gerlafingen (CH); Arkadius Peter Szepanski, Reckendorf (DE); Joerg Teichmann, Dallgow-Doeberritz (DE); Achim Von Seck, Wachenroth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/430,610

(22) PCT Filed: Sep. 6, 2013

(86) PCT No.: PCT/EP2013/068450
§ 371 (c)(1),
(2) Date: Mar. 24, 2015

(87) PCT Pub. No.: WO2014/044550
PCT Pub. Date: Mar. 27, 2014

(65) Prior Publication Data
US 2015/0255973 A1   Sep. 10, 2015

(30) Foreign Application Priority Data

Sep. 24, 2012 (DE) .......................... 10 2012 217 189

(51) Int. Cl.
*H01B 17/16* (2006.01)
*H02G 7/14* (2006.01)
(Continued)

(52) U.S. Cl.
CPC ................. *H02G 7/14* (2013.01); *F16F 7/14* (2013.01); *F16F 15/02* (2013.01); *F16F 15/023* (2013.01); *H02B 1/54* (2013.01)

(58) Field of Classification Search
CPC ............ F16F 7/14; F16F 15/02; F16F 15/023; H02G 7/14; H01B 17/265; H01F 27/04; H02B 1/54
(Continued)

(56) References Cited

U.S. PATENT DOCUMENTS

| 3,459,395 A * | 8/1969 | Scotto ..................... F16F 13/00 188/318 |
| 3,726,986 A | 4/1973 | Higaki et al. |

(Continued)

FOREIGN PATENT DOCUMENTS

| CA | 1190620 A1 | 7/1985 |
| CN | 1553997 A | 12/2004 |

(Continued)

*Primary Examiner* — Todd M Epps
(74) *Attorney, Agent, or Firm* — Laurence Greenberg; Werner Stemer; Ralph Locher

(57) ABSTRACT

A damping configuration for an oscillatably mounted, electrical energy transmission device includes a supporting frame which is connected to stationary abutments through a plurality of damping elements. A group of first and second damping elements which have damping rates dimensioned so as to differ from one another and which act in parallel, connect the supporting frame to the abutments. Favorable damping of both weaker and stronger movements, for example caused by an earthquake, is ensured due to a combination of damping elements having differently dimensioned damping rates.

8 Claims, 3 Drawing Sheets

(51) Int. Cl.
*H02B 1/54* (2006.01)
*F16F 7/14* (2006.01)
*F16F 15/02* (2006.01)
*F16F 15/023* (2006.01)

(58) Field of Classification Search
USPC .......................... 248/568; 174/161 R, 152 R
See application file for complete search history.

(56) References Cited

U.S. PATENT DOCUMENTS

| | | | | |
|---|---|---|---|---|
| 3,794,277 | A * | 2/1974 | Smedley | F16F 7/127 |
| | | | | 174/161 R |
| 4,267,400 | A * | 5/1981 | Kishida | H01B 17/16 |
| | | | | 174/152 R |
| 8,864,118 | B2 | 10/2014 | Frank | |
| 2004/0173426 | A1 * | 9/2004 | Athanasiou | F16F 3/04 |
| | | | | 188/378 |
| 2008/0006497 | A1 | 1/2008 | Athanasiou | |
| 2011/0094488 | A1 | 4/2011 | Frank | |

FOREIGN PATENT DOCUMENTS

| | | | | |
|---|---|---|---|---|
| DE | 3211089 | A1 | 10/1982 | |
| DE | 29514924 | U1 * | 11/1995 | ............... H02B 1/54 |
| DE | 10326625 | A1 | 1/2005 | |
| DE | 102008017926 | B3 * | 5/2009 | ............. F41A 25/12 |
| EP | 0077042 | A2 | 4/1983 | |
| JP | 2000253521 | A | 9/2000 | |
| KR | 100991972 | B1 * | 11/2010 | |
| KR | 101134503 | B1 | 4/2012 | |
| WO | 03023251 | A1 | 3/2003 | |

* cited by examiner

DAMPING ARRANGEMENT FOR AN OSCILLATABLY MOUNTED ELECTRICAL ENERGY TRANSMISSION DEVICE

BACKGROUND OF THE INVENTION

Field of the Invention

The invention relates to a damping arrangement for an electrical energy transmission device which is mounted such that it can oscillate and comprises a supporting frame, which is connected to at least one in particular stationary abutment via a plurality of damping elements.

Such a damping arrangement is known, for example, from the German utility model DE 295 14 924 U1. Said document describes a modular unit comprising a protective device for protecting against earthquakes. A surge arrestor of the modular unit is supported on a four-armed supporting body. The four-armed supporting body in turn is mounted on a pedestal via four wire cable springs. The damping elements provided on the known damping arrangement make it possible for the surge arrestor positioned there to oscillate. Forces occurring at the surge arrestor can be converted into heat in the damping elements. The damping elements are used firstly for mounting the surge arrestor such that it is capable of oscillating and secondly for damping an oscillation. The known damping arrangement is configured to damp oscillations occurring within a narrow band. This means that either low-energy oscillations are damped effectively, whereas high-energy oscillations may not be sufficiently damped, or vice versa. Also, a stronger or weaker design of the damping elements does not result in a solution to the problem since either excessive oscillations are permitted or there is excessively rigid mounting of the surge arrestor.

BRIEF SUMMARY OF THE INVENTION

To this extent, the object of the invention consists in specifying a damping arrangement which manages oscillations within a broader band.

In accordance with the invention, this object is achieved in the case of a damping arrangement of the type mentioned at the outset by virtue of the fact that a first and a second damping element, which have mutually different rated damping rates, connect, with parallel action, the mounting frame to at least one abutment.

Damping elements are used for damping a movement in order to allow an oscillation amplitude to peter out undamped, for example. Such damping elements can be arranged, for example, on a supporting frame, which is in turn connected to at least one in particular stationary abutment via the damping elements. A supporting frame is understood to mean those component parts which are used for transmitting forces, in particular holding and supporting forces, on the entire system. For example, housings, supporting feet, struts, etc., which are not connected directly to the damping elements, can also act as supporting frame. Pedestals can be used as stationary abutment, for example. The supporting frame is used for forming a platform in order to position an electrical energy transmission device and to absorb forces emanating from the electrical energy transmission device or acting on this electrical energy transmission device and to introduce these forces into the damping elements. The damping elements can be in the form of wire cable springs, for example, which firstly enable an oscillation of the supporting frame and secondly, owing to the internal friction, bring about damping of a movement of the supporting frame. The different rated damping rates have the effect that the intensity of the conversion of kinematic energy into, for example, thermal energy differs from one another in the first and second damping elements. In other words, the first damping element functions with lower losses than the second damping element. When using wire cable springs, said wire cable springs can have different intrinsic frictions, as a result of which the movability of said springs (force-distance behavior) is comparable, but energy conversion takes place to different degrees with identical movements. A similar behavior can be achieved, for example, when using alternative damping elements. Owing to the use of different rated damping rates, two groups of damping elements are formed which damp a movement to different degrees. The damping elements can in this case be used firstly for damping a movement, and secondly the damping elements can also be used to support the supporting frame with the capability for oscillation. In particular, the damping elements can position the supporting frame with respect to abutments. As such, all of the damping elements or only the first or only the second damping elements can also be used for supporting and positioning the supporting frame and thus the electrical energy transmission device. However, provision can also be made for all of the first and second damping elements to both perform a supporting function and have a damping effect on the supporting frame relative to the abutments.

The use of damping elements with different rated damping rates makes it possible to allow only the first damping elements to have a damping effect during slight oscillations of the supporting frame, for example, whereas the second damping elements are only effectively incorporated in a damping process when a specific deflection or frequency of a movement of the supporting frame is exceeded. By virtue of a parallel arrangement of the first and second damping elements, stabilization, if required, of a movement of the supporting frame and support for the supporting frame are provided.

An electrical energy transmission device is understood to mean all devices which are used for transmitting electrical energy, for example via phase conductors through which a current is flowing. Examples of electrical energy transmission devices are circuit breakers, switch disconnectors, grounding switches, busbar sections, surge arrestors, current transformers, voltage transformers, switchgear etc. The electrical energy transmission devices can be used, for example, in the high-voltage and medium-voltage ranges.

In addition to the absorption of slight movements by the damping elements with relatively small rated damping rates, in the event of the occurrence of relatively large forces which result in increased movements, the damping behavior can be determined at the supporting frame by the damping elements with relatively high rated damping rates.

Furthermore, provision can advantageously be made for at least the first and/or at least the second damping element to have a substantially linear damping behavior.

A linear damping behavior enables an approximately proportional increase in the damping effect with increasing deflection of the supporting frame. Preferably, a substantially linear distance-time profile should be set. The use of mutually different damping characteristics for the first and second damping elements leads to a resultant damping rate at the supporting frame. The linearity profile of the resultant damping rates can have an enlarged bandwidth of a linear damping effect. When using spring arrangements in the damping elements, the force-distance characteristics of said damping elements should be approximately the same.

Therefore, it is possible to introduce movements into the first and second damping elements in parallel. Only the damping of the movement at the first and second damping elements is different from one another. It is thus possible, for example, for the first and second damping elements to be used to support the damping arrangement.

As a deviation from this, however, provision can also be made for damping elements with different force-distance to be used so that a resultant force-distance characteristic for the entire system is set.

A further advantageous configuration can provide for a plurality of damping elements to be arranged distributed along a path, wherein first and second damping elements alternate with one another over the course of the path.

A path may have different types of path courses. For example, a path can have a linear extent, be curved or else be closed, in particular circular. The various damping elements need to be positioned along a course of the path, wherein the damping elements should be arranged alternately with respect to one another over the course of the path. It is therefore possible for in each case a first or a second damping element to be flanked by second or first damping elements. Correspondingly, the different rated damping rates of the first and second damping elements can be superimposed on one another, distributed along the path. It is thus ensured that transmission and introduction of movements of the oscillatory system to/into the damping elements which is as uniform as possible takes place on the supporting frame. Therefore, pointwise overloads at the supporting frame can be avoided.

In particular when using a path course which is closed, for example circular, rectangular or else polygonal path courses, the electrical energy transmission device with the supporting frame can be positioned centrally in a region encompassed by the path. Thus, movement on all sides about a vertical or tilting out of a vertical is provided in a simple manner. For example, provision can be made for the supporting frame to have, centrally, a receiving region, from which supporting sections, for example supporting arms, are arranged so as to extend radially outward, with the corresponding damping elements being located on the ends of said supporting sections.

Provision can furthermore advantageously be made for the first and second damping elements to have the same design.

The use of the same designs for the damping elements makes it possible to use, for example, standardized damping elements and to combine these damping elements with one another as required and to install them on the damping arrangement. The same designs make it possible to use modular constructions. For example, all of the damping elements can be in the form of wire cable springs.

Furthermore, provision can advantageously be made for the first and second damping elements to have different designs from one another.

The use of different designs of damping elements results in greater variety for the matching of the different rated damping rates. It is thus possible, for example, to use a wire cable spring as first damping element and a hydraulic damper, for example, as second damping element. The use of different designs furthermore makes it possible to use only the first damping elements for mounting and supporting the supporting frame, for example, whereas the second damping elements are kept free of bearing forces and only have a damping effect in the case of movements.

Furthermore, provision can advantageously be made for the first and/or second damping element(s) to act in the manner of a friction damper.

Friction dampers have a comparatively simple design since relative movements are damped by friction losses. Leaf springs, elastomer springs, helical springs or else wire cable springs can be used as friction dampers. Such friction dampers have comparatively low levels of wear and barely require any maintenance.

A further advantageous configuration can provide for the first and/or second damping element(s) to act in the manner of a hydraulic damper.

The use of hydraulic dampers makes it possible to match the damping behavior of the damping arrangement finely. Preferably, the second damping elements, i.e. the damping elements which have a greater rated damping rate, should be provided with an approximately linear damping behavior. This should be provided independently of the design of the damping element.

A third advantageous configuration can provide for the first and/or the second damping element(s) to act in the manner of a pneumatic damper.

The use of gases for generating damping forces provides the possibility of low-mass damping elements at high damping forces.

Damping elements having hydraulic and pneumatic dampers should preferably only be used for damping a movement and be freed of supporting and holding forces of the supporting frame.

A further advantageous configuration can provide for the damping element with the lower rated damping rate to support the supporting frame.

Damping elements with the lower rated damping rate can support the supporting frame with respect to an abutment. A system is thus provided which, in the case of low-energy movements at the supporting frame, introduces forces into the abutment. Additional holding mechanisms which position the supporting frame with respect to the abutment are thus not required.

Instead, the first damping element or the group of first damping elements with a lower rated damping rate can have a supporting function and holding function for the supporting frame.

The damping element or the group of damping elements which have a higher rated damping rate can be used as backup for supporting the supporting frame, however. For example, wire cable springs which have different damping rates can be used. This is possible, for example, owing to the fact that different types of strands/wires of different materials are twisted with one another or the surface structure of the stranded wires have different coefficients of friction, with the result that different damping behaviors for the same oscillation behavior are provided. Different coefficients of friction can be achieved by surface coatings such as zinc plating or galvanic surface protection, for example.

BRIEF DESCRIPTION OF THE SEVERAL VIEWS OF THE DRAWING

An exemplary embodiment of the invention is shown schematically in a drawing and will be described in more detail below. In the drawing FIG. 4 shows a hydraulic damper or a pneumatic damper.

DESCRIPTION OF THE INVENTION

Figure 1:
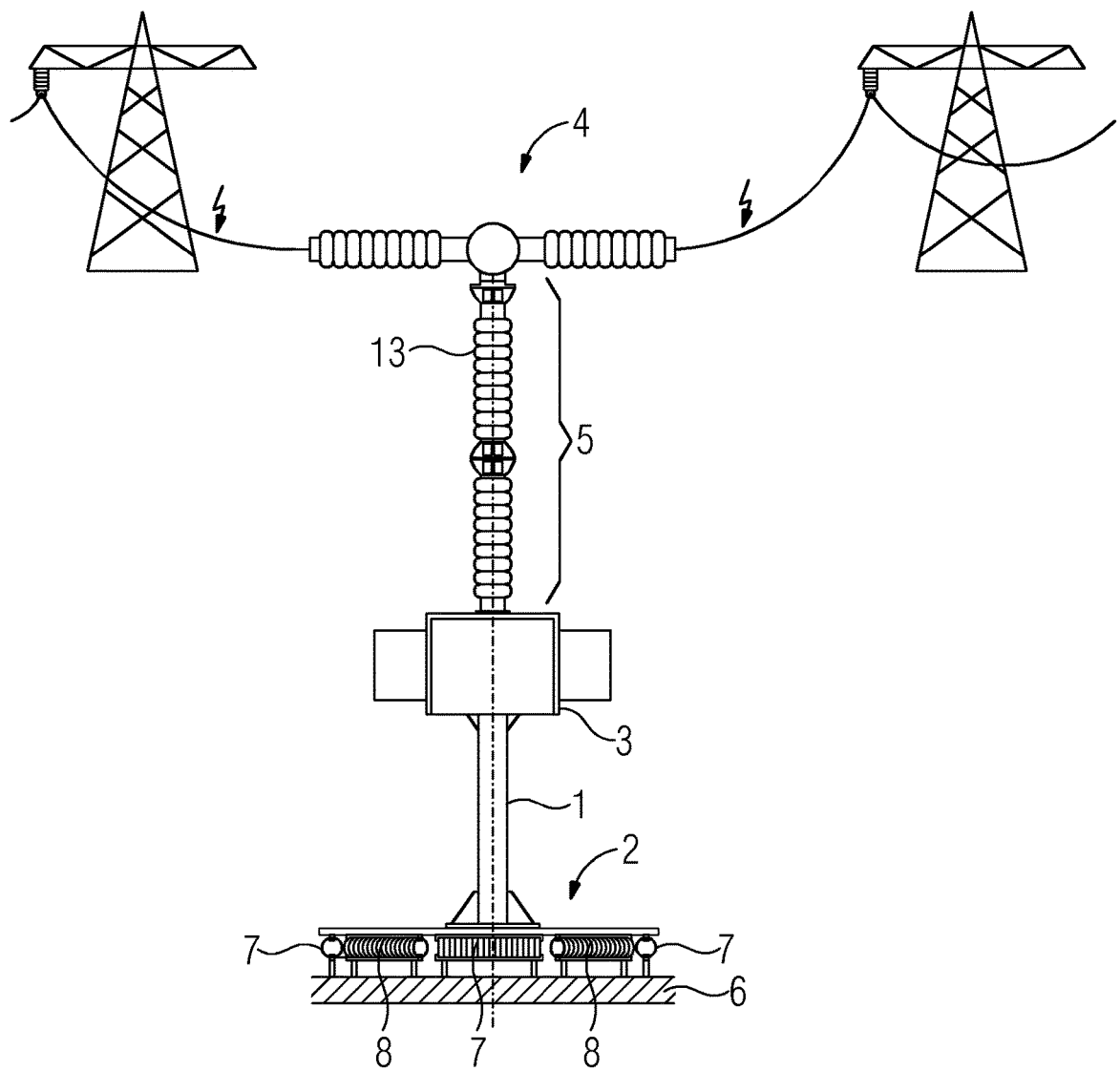
FIG. 1 shows a view of a damping arrangement comprising a supporting frame.

FIG. 1 shows a side view of an electrical energy transmission device. The electrical energy transmission device is provided with an upright 1. The upright 1 is part of a supporting frame 2. A drive device 3 is supported on the upright 1. The drive device 3 is accommodated in a housing providing protection against weathering influences. The drive device 3 is used for driving switching contact pieces of an interrupter unit of a circuit breaker 4 which are movable relative to one another. The circuit breaker 4 has a base with a post insulator 5, which is supported on that end of the upright 1 on which the drive device 3 is arranged. The post insulator 5 is hollow, with the result that transmission of a movement output by the drive device 3 via a kinematic chain in the interior of the post insulator 5 can take place and can be transmitted to the switching contact pieces of the circuit breaker which are movable relative to one another.

The supporting frame 2 is supported on a pedestal 6. The pedestal 6 is anchored in the ground and acts as abutment. The supporting frame 2 is supported on the pedestal 6 via a plurality of first and a plurality of second damping elements 7, 8. The damping elements 7, 8 are arranged along a circular path, wherein a first and a second damping element 7, 8 are arranged in each case successively around the circular path. Preferably, the number of first and second damping elements 7, 8 should be an even number, so that a continuous change between the first and second damping elements 7, 8 is provided in the case of a closed revolution of the path. The first and second damping elements 7, 8 have mutually different rated damping rates, i.e. the first damping elements 7 are provided with a weaker rated damping rate than the rated damping rate of the second damping elements 8. In other words, the first damping elements 7 convert kinetic energy into other energy forms, for example heat, to a lesser extent than the second damping elements 8. In this case, the first and second damping elements 7, 8 each have the same designs. In the present exemplary embodiment, the use of wire cable spring dampers is provided.

Figure 2:
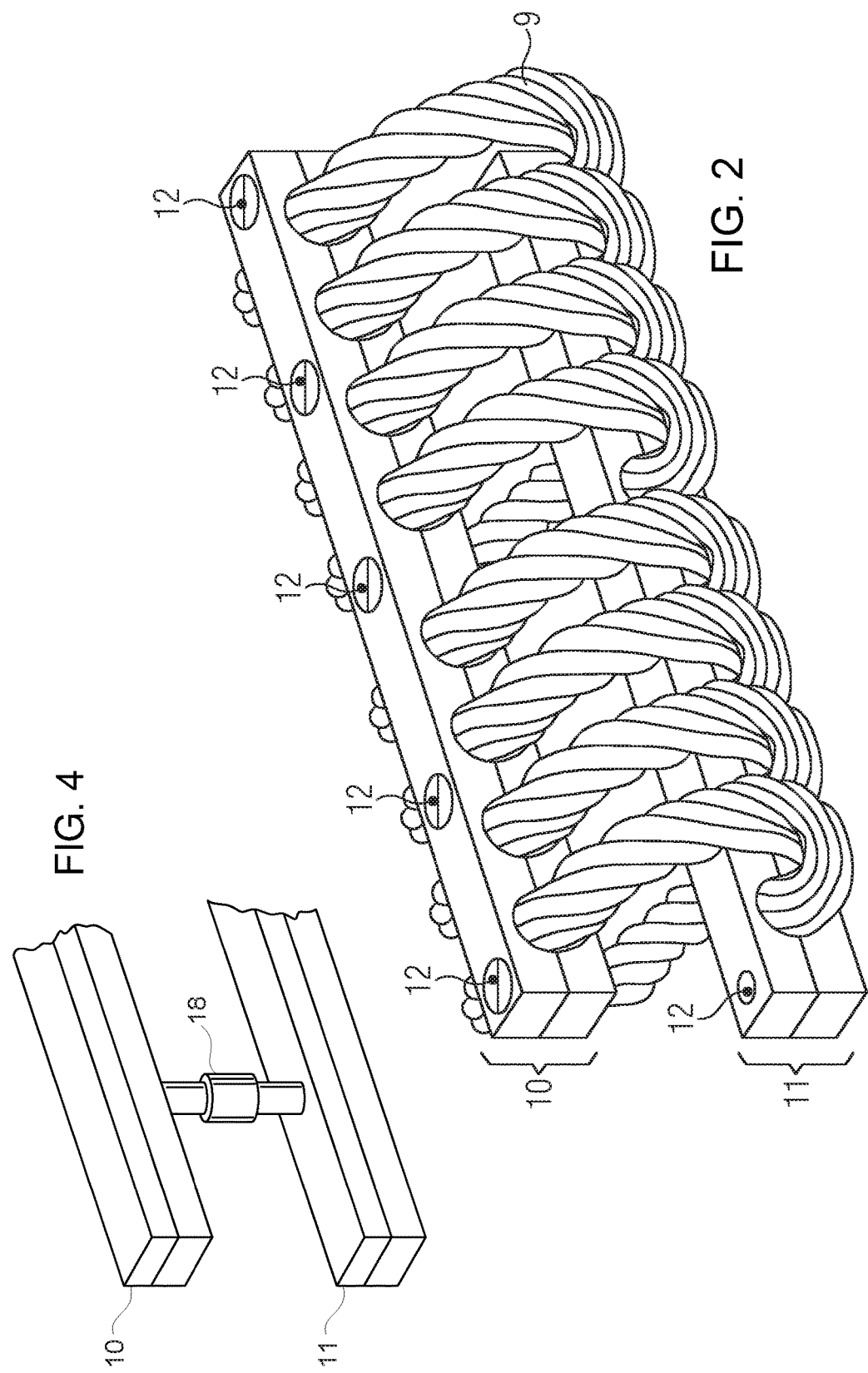
FIG. 2 shows a view of a wire cable spring.

By way of example, a design of a wire cable spring damper is illustrated in FIG. 2. A wire spring damper has a multiply stranded wire cable 9, which is wound helically with elastic deformation. In order to keep the wire cable 9 wound in helical fashion in shape, a first yoke 10 and a second yoke 11 are provided in the direction of the winding axis of the wire cable 9. The yokes 10, 11 are oriented substantially parallel to one another and lie, on the lateral surface side, on mutually opposite sides of the wound wire cable 9. In this case, the yokes 10, 11 are formed in two parts, wherein in each case cutouts are provided in a joint between the yokes 10, 11, through which cutouts the turns of the wire pass. The turns are spaced apart from one another via the yokes 10, 11, wherein spontaneous unwinding of the turns is prevented. The subelements of the yokes 10, 11 are fixed so as to press the wire cable 9 into the cutouts by means of threaded bolts 12. As a result, a helical profile of the wire cable 9 is established. The wire cable springs of the first damping elements 7 have a lower intrinsic damping/friction than the wire cable springs of the second damping elements 8.

It is possible by virtue of the two yokes 10, 11 to fasten firstly the supporting frame 2 and secondly the pedestal 6. For this purpose, studs are illustrated symbolically on the pedestal 6 in FIG. 1, with the respective second yoke 11 of the damping elements 7, 8 being fastened on said pedestal. Opposite this, the first yoke 10 is connected to the supporting frame 2. As a result, the winding axis of the wire cable 9 is substantially perpendicular to a weight force axis 13, with which weight forces of the circuit breaker 4 at rest are introduced into the supporting frame 2 or into the pedestal 6. The first and second damping elements 7, 8 in this case each serve to mount the electrical energy transmission device comprising the supporting frame 2 in oscillatory fashion. Provision is made here for both the first and the second damping elements 7, 8 to be used for mounting the electrical energy transmission device. Alternatively, however, provision can also be made for only the first damping elements 7, which have the reduced rated damping rate, to perform a supporting function for the electrical energy transmission device, whereas the second damping elements 8, which have a greater rated damping rate, can merely serve to damp a relative movement of the supporting frame with respect to the pedestal or another abutment.

The outer configuration of the damping elements 7, 8 used is identical independently of their respective rated damping rate. Preferably, in each case an identical number of turns, an identical dimensioning of the turns and the use of identical yokes 10, 11 are provided. The damping rate is determined substantially by the type of stranding of the wires of the wire cable 9 and the surface properties thereof, i.e. the intrinsic friction behavior of the wires of the wire cable 9.

Furthermore, provision can also be made, however, for a variation to be provided between the first and second damping elements 7, 8 via the dimensioning of the wire cable 9, the number of turns, the diameter of the turns, etc.

In addition to the use of identical designs for the first and second damping elements 7, 8, mutually different designs can also be used for the first and second damping elements 7, 8. For example, alternative constructions of friction dampers, such as, for example, spiral springs, leaf springs, elastomer buffers, etc. can be used. However, provision can also be made for a hydraulic damper or a pneumatic damper 18 shown in FIG. 4 in the manner of a hydraulic spring or in the manner of a pneumatic spring to be used as damping element.

Figure 3:
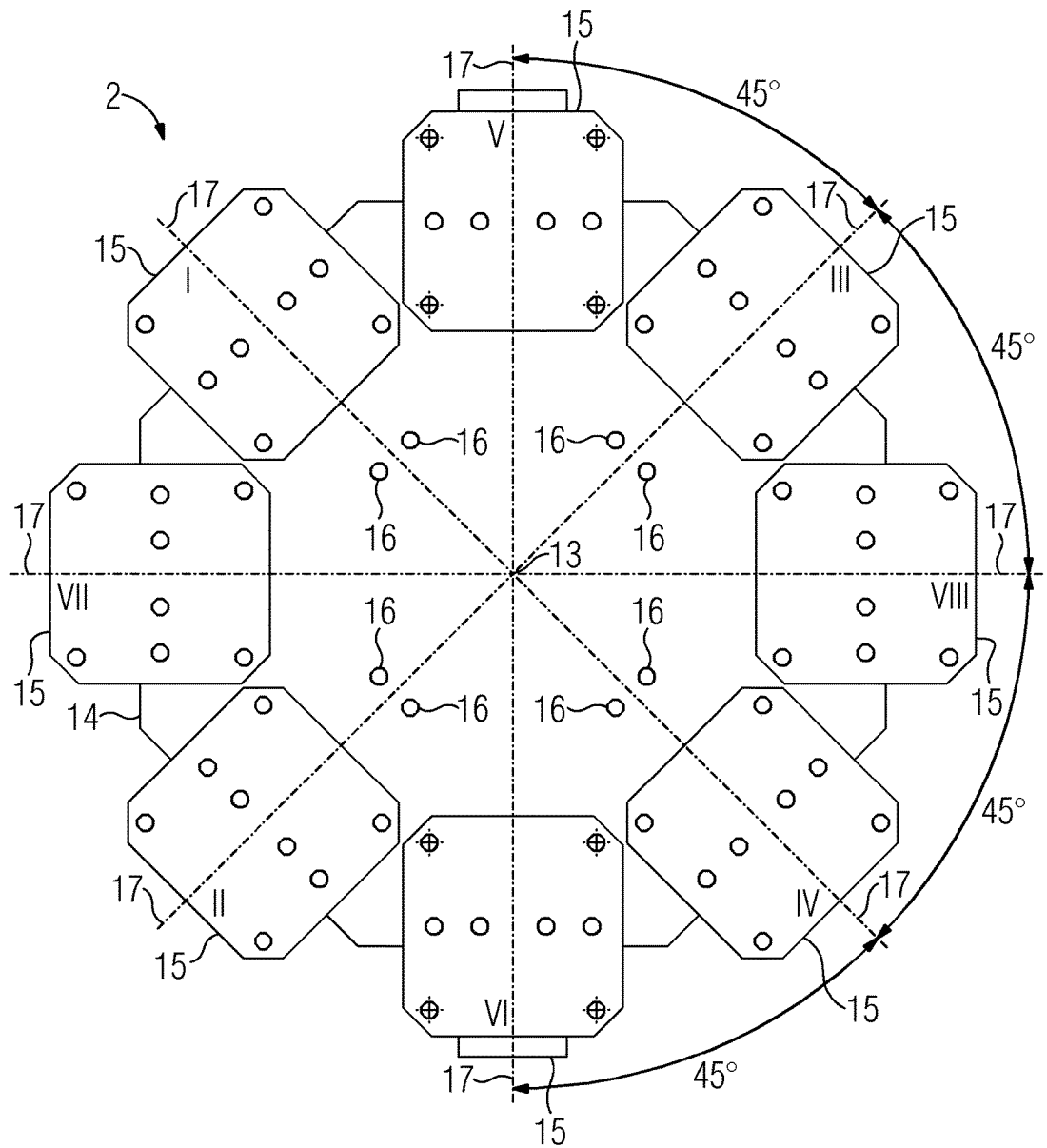
FIG. 3 shows a plan view of the supporting frame known from FIG. 1.

FIG. 3 illustrates a plan view of the supporting frame 2. The supporting frame 2 has an octagonal base plate 14, which is substantially planar. A plurality of substantially rectangular receiving plates 15 are connected to the base plate 14 at a rigid angle on a circular path, which is arranged centrally with respect to the center point of the octagonal base plate 14. In each case one outer edge delimiting the receiving plates 15 is in this case oriented substantially parallel or perpendicular to a body edge of the hexagonal base plate 14. The receiving plates 15 are in this case connected flat to the base plate 14, with the receiving plates 15 protruding beyond the sides between the eight corners of the base plate 14. The receiving plates 15 are therefore arranged distributed on a circular path/polygon function around the center of the base plate 14. Cutouts 16 are arranged in the center of the base plate 14 (point of intersection between the central verticals of the sides of the base plate 14), and the upright 1 can be bolted in said cutouts, with the result that the weight force axis 13 is in this case perpendicular to the plane of the drawing in FIG. 3. The receiving plates 15 are arranged distributed symmetrically around the circular path, with the result that the receiving plates 15 are in a circular orbit, in each case pivoted through an angular dimension of 45°. Correspondingly, eight receiving plates 15 result in the orbit, which receiving plates are used for receiving four first damping elements 7 and four second damping elements 8. The positions of the four first damping elements 7 are denoted by the Roman numerals I, II, III and IV. The position of the four second damping elements 8 is denoted by the Roman numerals V, VI, VII and VIII. The first and second damping elements 7, 8 in the form of wire cable spring dampers are in this case positioned on the supporting frame 2 in such a way that the winding axes (in the same way as the longitudinal axes of the yokes 10, 11) are oriented parallel to the sides of the octagon of the base plate 14. Correspondingly, the winding axes of the wire springs are each substantially perpendicular to the central vertical 17 of the sides of the base plate 14.

In the case of a movement of the circuit breaker 4, a movement is transmitted to the first and second damping elements 7, 8. Both groups of first and second damping elements 7, 8 are involved in oscillatory supporting of the supporting frame 2, wherein, owing to the selection of the rated damping rates, initially at least substantially only the first damping elements 7, i.e. the damping elements with the lower rated damping rate, perform damping of the introduced movement during deformation. On the other hand, the group of second damping elements 8 at first does not have any damping effect (or a comparatively insubstantially small damping effect). Only when there is an increase in the amplitude and/or the rate/frequency of the movement on the supporting frame 2 relative to the pedestal 6 does additional damping parallel to the (possibly decreasing) damping effect of the first group of first damping elements 7 by the group of second damping elements 8 become effective. Thus, both in the case of small movements at the electrical energy transmission device, slight damping is made possible and, in the case of an increase in the amplitude of the movement, said movement is damped to a greater degree by the second damping elements 8.

The invention claimed is:

1. A damping configuration for an oscillatably mounted electrical energy transmission device, the damping configuration comprising:

at least one abutment having an upper surface disposed along a plane;

a supporting frame; and a plurality of mutually parallel damping elements including first and second damping elements having mutually different rated damping rates, said damping elements having a lower rated damping rate supporting said supporting frame;

said first and second damping elements acting in parallel to connect said supporting frame to said at least one abutment;

said plurality of damping elements having longitudinal axes distributed along a circular path parallel to said plane of said upper surface of said at least one abutment, and said first and second damping elements alternating with one another over a course of said path.

2. The damping configuration according to claim 1, wherein said at least one abutment is stationary.

3. The damping configuration according to claim 1, wherein at least one of said first or second damping elements has a substantially linear damping behavior.

4. The damping configuration according to claim 1, wherein said first and second damping elements have an identical construction.

5. The damping configuration according to claim 1, wherein said first and second damping elements have constructions differing from each another.

6. The damping configuration according to claim 1, wherein at least one of said first or second damping elements acts as a friction damper.

7. The damping configuration according to claim 1, wherein at least one of said first or second damping elements acts as a hydraulic damper.

8. The damping configuration according to claim 1, wherein at least one of said first or second damping elements acts as a pneumatic damper.

* * * * *